United States Patent
Bernaudo

(10) Patent No.: US 11,596,146 B2
(45) Date of Patent: Mar. 7, 2023

(54) SPEED CONTROLLED CENTRIFUGAL PUMP EMBALMING SYSTEMS AND METHOD OF USING THE SAME

(71) Applicant: Joseph Mario Bernaudo, Bay Shore, NY (US)

(72) Inventor: Joseph Mario Bernaudo, Bay Shore, NY (US)

(*) Notice: Subject to any disclaimer, the term of this patent is extended or adjusted under 35 U.S.C. 154(b) by 399 days.

(21) Appl. No.: 16/905,982

(22) Filed: Jun. 19, 2020

(65) Prior Publication Data

US 2020/0396987 A1 Dec. 24, 2020

Related U.S. Application Data

(60) Provisional application No. 62/863,943, filed on Jun. 20, 2019.

(51) Int. Cl.
*G01L 19/00* (2006.01)
*A01N 1/02* (2006.01)
*G05D 7/06* (2006.01)

(52) U.S. Cl.
CPC ........ *A01N 1/0247* (2013.01); *G01L 19/0007* (2013.01); *G05D 7/0688* (2013.01)

(58) Field of Classification Search
None
See application file for complete search history.

(56) References Cited

U.S. PATENT DOCUMENTS

| 5,217,860 A * | 6/1993 | Fahy ................... A01N 1/0221 435/1.2 |
| 8,323,954 B2 * | 12/2012 | Kravitz ................ A01N 1/0247 435/284.1 |
| 2006/0154357 A1 * | 7/2006 | Hassanein ............... A01N 1/02 435/284.1 |

* cited by examiner

*Primary Examiner* — Lisa M Caputo
*Assistant Examiner* — Nigel H Plumb
(74) *Attorney, Agent, or Firm* — Carter, DeLuca & Farrel, LLP; Francesco Sardone, Esq.

(57) ABSTRACT

An embalming machine including a housing, at least one fluid tank supported by the housing, a plurality of hose segments disposed at least partially within the housing, a centrifugal fluid transfer pump, a pressure gauge, and a first solenoid is disclosed. The pump is engaged with at least one hose segment of the plurality of hose segments. The pressure gauge is configured to read a pressure of the fluid flowing therethrough. The first solenoid is configured to allow fluid to flow therethrough when current is applied to the first solenoid, and is configured to prevent fluid from flowing therethrough when no current is applied to the first solenoid, wherein the centrifugal fluid transfer is controlled to improve displacement output and pressure of embalming fluid entering a cadaver during an embalming process.

19 Claims, 8 Drawing Sheets

SPEED CONTROLLED CENTRIFUGAL PUMP EMBALMING SYSTEMS AND METHOD OF USING THE SAME

CROSS-REFERENCE TO RELATED APPLICATION

The present application claims the benefit of and priority to U.S. Provisional Patent Application Ser. No. 62/863,943, filed on Jun. 20, 2019, the entire content of which is incorporated by reference herein.

BACKGROUND

Technical Field

The present disclosure relates to devices used for fluid displacement during arterial embalming. More specifically, the present disclosure relates to a speed controlled centrifugal pump embalming systems and method of using the same.

Description of Related Art

In order to restore and preserve the human body for anatomical or funeral purposes embalming fluid is displaced into the vascular system removing and replacing the blood where the operator would attempt to apply ideal pressure of fluid delivery. Today, there are several embalming machines which regulate pressure and flow from the machine. Additionally, a single reservoir embalming machine is typically used to restore and preserve the human body: however, a first injection of surfactants is commonly advised as best practice to condition the vascular system of the body for greater distribution and diffusion of preservative chemicals, and a second injection is used to inject preservative chemical into the body. Further, the operator of the machines will typically make adjustments during the operation based on the apparent results to find the ideal injection with fluid solution, injection output pressure and flow rate of the fluids, which is much like guess and check while machine measurements which are merely a frame of reference and having a single reservoir for fluid solutions.

Accordingly, an embalming machine that controls the speed of its centrifugal fluid transfer pump may be a beneficial way to adjust and measure injection displacement output and pressure.

Additionally, since one licensed embalmer may be employed at several establishments, the system of the present disclosure is easily portable aiding the transport of equipment from one location to another.

SUMMARY

The present disclosure relates to an embalming machine including a housing, at least one fluid tank supported by the housing, a plurality of hose segments disposed at least partially within the housing, a pump, a pressure gauge, and a first solenoid. The at least one fluid tank is configured to store at least a first fluid. The plurality of hose segments is in fluid communication with the at least one fluid tank. The pump is engaged with at least one hose segment of the plurality of hose segments. The pressure gauge is engaged with at least one hose segment of the plurality of hose segments and is configured to read a pressure of the fluid flowing therethrough. The first solenoid is engaged with at least one hose segment of the plurality of hose segments and is configured to allow fluid to flow therethrough when current is applied to the first solenoid, and is configured to prevent fluid from flowing therethrough when no current is applied to the first solenoid.

In disclosed embodiments, the embalming machine includes a plumbing tee disposed in fluid communication with three hose segments of the plurality of hose segments. The plumbing tee establishes a first fluid path where the fluid therein exits the embalming machine, and a second fluid path where the fluid therein recirculates within the embalming machine. In embodiments, the first solenoid is disposed within the first fluid path. It is further disclosed that the embalming machine includes a second solenoid disposed within the second fluid path. The second solenoid is configured to allow fluid to flow therethrough when current is applied to the second solenoid, and is configured to prevent fluid from flowing therethrough when no current is applied to the second solenoid. In embodiments, the embalming machine includes a switch disposed in electrical communication with the second solenoid, and is configured to enable fluid to flow through the second solenoid in a pulsing manner. It is disclosed that a relief controller is within the second fluid path between the plumbing tee and the second solenoid and is configured to allow adjustment of the volume of fluid flowing therethrough.

It is also disclosed that the embalming machine includes a pump controller disposed in electrical communication with the pump and configured to control a speed at which the pump operates.

In disclosed embodiments, the at least one fluid tank includes a first fluid tank and a second fluid tank. It is disclosed that the embalming machine is configured to selectively circulate fluid from the first fluid tank or fluid from the second fluid tank. It is further disclosed that the first and/or second fluid tank includes a check valve on an upper portion thereof which allows gas to enter the fluid tank and prevents gas from exiting the fluid tank. In embodiments, the check valve allows fluid within the fluid tank to mix in a top-down manner.

The present disclosure also relates to an embalming machine including a housing, a first fluid tank, a second fluid tank, a plurality of hose segments, a pressure gauge, and a valve. The first fluid tank is supported by the housing and is configured to store a first fluid. The second fluid tank is supported by the housing and is configured to store a second fluid. The plurality of hose segments is disposed at least partially within the housing an is in fluid communication with the first fluid tank and the second fluid tank. The pump is engaged with at least one hose segment of the plurality of hose segments. The pressure gauge is engaged with at least one hose segment of the plurality of hose segments and is configured to read a pressure of the second fluid flowing therethrough. The valve is disposed in fluid communication with at least one hose segment of the plurality of hose segments and is configured to allow adjustment of the volume of fluid flowing therethrough. The embalming machine is configured to selectively circulate with the first fluid from the first fluid tank or the second fluid from the second fluid tank.

In disclosed embodiments, the first fluid tank includes a check valve on an upper portion thereof which allows gas to enter the first fluid tank and prevents gas from exiting the first fluid tank. The second fluid tank includes a check valve on an upper portion thereof which allows gas to enter the second fluid tank and prevents gas from exiting the second fluid tank.

In embodiments, the embalming machine includes a plumbing tee disposed in fluid communication with three hose segments of the plurality of hose segments. The plumbing tee establishes a first fluid path where the fluid therein exits the embalming machine, and a second fluid path where the fluid therein recirculates within the embalming machine.

In disclosed embodiments, the embalming machine includes a first solenoid, a second solenoid, and a switch. The first solenoid is disposed within the first fluid path, and the second solenoid is disposed within the second fluid path. The first solenoid is configured to allow fluid to flow therethrough when current is applied to the first solenoid, and is configured to prevent fluid from flowing therethrough when no current is applied to the first solenoid. The second solenoid is configured to allow fluid to flow therethrough when current is applied to the second solenoid, and is configured to prevent fluid from flowing therethrough when no current is applied to the second solenoid. The switch is disposed in electrical communication with the second solenoid, and is configured to enable fluid to flow through the second solenoid in a pulsing manner.

The present disclosure also relates to a method of embalming a cadaver. The method includes moving a first fluid from a first fluid tank of an embalming machine through a plurality of hose segments, and into the cadaver, moving a second fluid from a second fluid tank of the embalming machine through the plurality of hose segments, and into the cadaver, selectively supplying current to a first solenoid of the embalming machine to permit the flow of the second fluid therethrough, determining the pressure of the second fluid before the second fluid flows through the first solenoid, and adjusting a speed of a pump of the embalming machine.

In disclosed embodiments, the method also includes introducing air into the first fluid tank through a first check valve located on the first fluid tank, and introducing air into the second fluid tank through a second check valve located on the second fluid tank.

In embodiments, the method also includes selectively supplying current to a second solenoid to enable the second fluid to flow therethrough in a pulsing manner.

BRIEF DESCRIPTION OF THE DRAWINGS

Various embodiments of the present disclosure are described herein below with references to the drawings, wherein.

DETAILED DESCRIPTION

Figure 1:
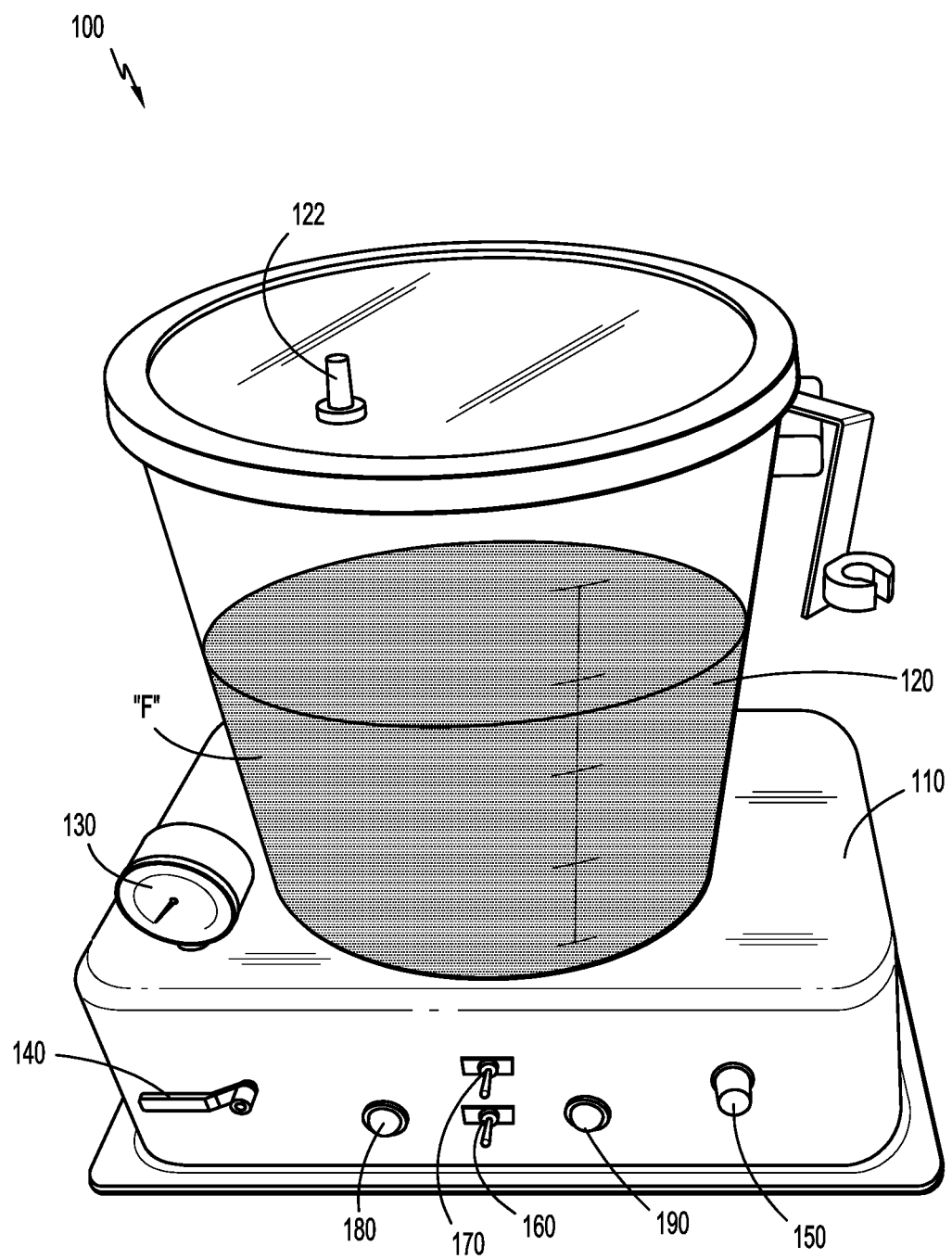
FIG. 1 is a perspective view of an embalming machine having one reservoir in accordance with an embodiment of the present disclosure.

In accordance with the present disclosure, a two embodiments of a speed controlled embalming machine are presented as illustrated in the attached figures. FIGS. 1-4 illustrate a first embodiment of an embalming machine, which is generally indicated by reference character 100. FIGS. 5-8 illustrate a second embodiment of an embalming machine, which is generally indicated by reference character 1000.

With initial reference to FIGS. 1-4, the first embodiment of the embalming machine 100 is shown. With particular reference to FIG. 1, the embalming machine 100 includes a housing 110, a fluid tank 120, a pressure gauge 130, a lever 140 (engaged with a relief controller 240), a pump controller 150, a first switch 160, a second switch 170, a first indicator light 180, and a second indicator light 190. Generally, the embalming machine 100 effectively and efficiently delivers fluid "F" (e.g., embalming fluid) from within the fluid tank 120 into a human body (e.g., cadaver) within a particular pressure and flow range.

Figure 3:
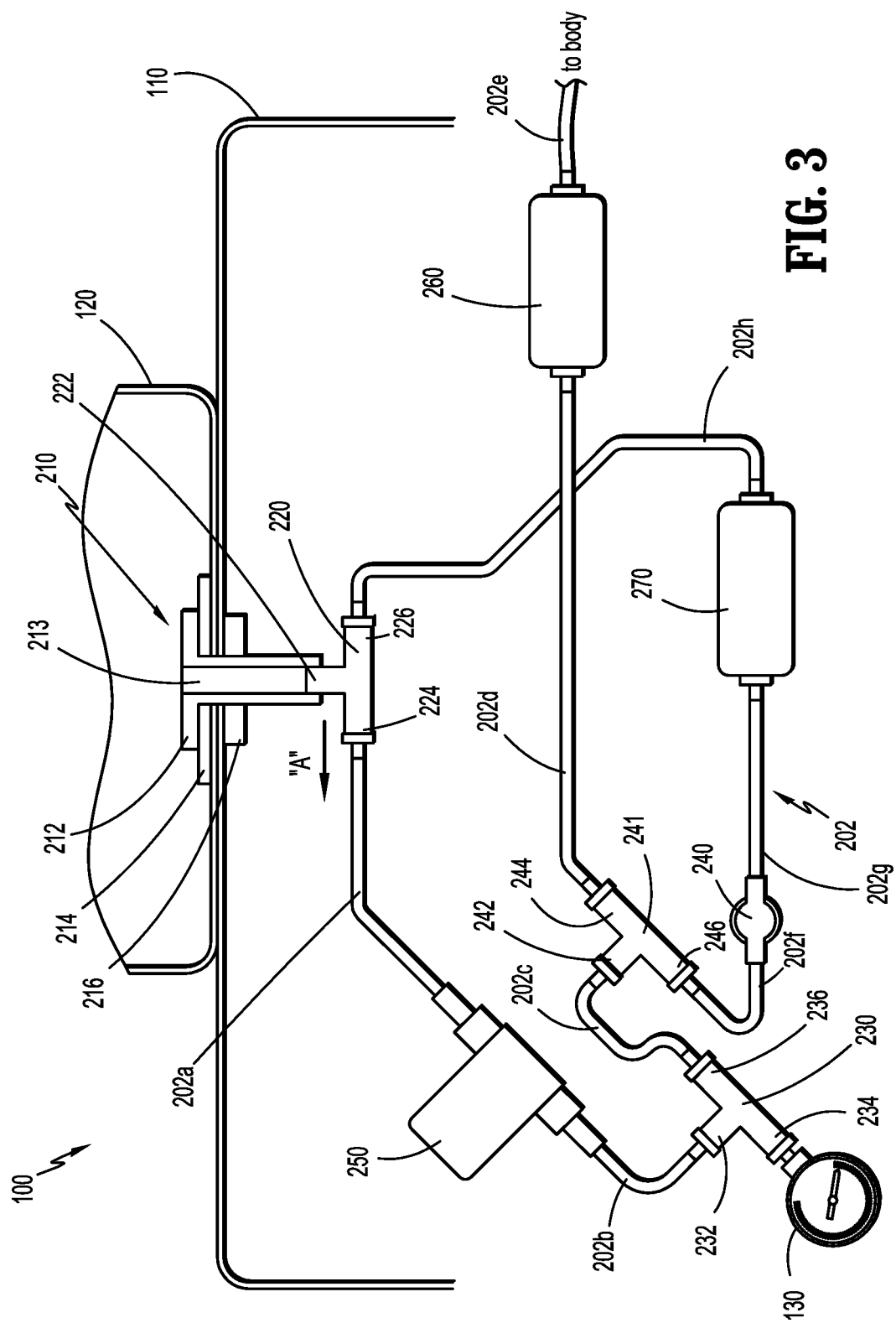
FIG. 3 is a schematic diagram illustrating various plumbing components of the embalming machine of FIGS. 1 and 2.

The fluid tank 120 is supported by the housing 110 and is operably engaged with plumbing components within the housing 110 via a bulkhead connection 200 (FIG. 3). The fluid tank 120 includes a check valve 122 on an upper portion thereof which allows air to enter the fluid tank 120 to help enable the mixing of gas and/or fluid within the fluid tank 120 in a top-to-bottom manner through the plumbing components and displace fluid in the same manner. The check valve 122 also prevents air/gas from exiting the fluid tank 120. Additionally, the check valve 122, which permits the flow of air or liquid into the reservoir only, prevents chemicals from becoming airborne and exposing the operator to the harsh chemicals. The embalming machine 100 with the check valve 122 can be emptied and cleaned with fresh solution without regurgitation back to the fluid tank 120. Further, fluid can be introduced (initially introduced and/or recirculated) to the fluid tank 120 through the check valve 122.

The pressure gauge 130 is engaged with a portion of the plumbing components within the housing 110 (discussed below), and allows a user to see the pressure of the fluid that is flowing therethrough. The pressure gauge 130 may include a digital display measurement. The pressure gauge 130 represents actual pump force being applied from the point of injection into the human body while the relief controller 240 does not permit fluid flow therethrough for recirculation. In any varied adjustment of the relief controller 240, the pressure gauge 130 provides a frame of reference which can help the user better determine the speed at which the pump (discussed below) should be operated.

The relief controller 240 (e.g., ball valve) is operatively engaged with the lever 140 (FIG. 1), and allows a user to adjust the amount of fluid flowing therethrough. More specifically, the lever 140 and relief controller 240 allows for user adjustment, as fluid exits the embalming machine 100 and into the human body, of an alternative path for fluid travel which recirculates fluid through various parts of the embalming machine 100. In any such adjustment, the force and displacement of fluid exiting the embalming machine 100 and into the human body will have been modified.

The pump controller 150 is configured as a knob, is operably (e.g., electrically) connected to a pump 250 (FIGS. 2-4), and is configured to control the speed at which the pump 250 operates. While the pump controller 150 is illustrated as a knob, any suitable type of mechanism to control the speed of the pump may be used. During use, adjusting or controlling the speed of the pump 250 helps the set the pressure (shown on the pressure gauge 130) and displacement to an appropriate pressure displacement or within a desired range. The pump controller 150 may include a digital display measurement of electrical current and be operated remotely (e.g., by remote control).

The first switch 160 is a double throw switch and is configured to switch the embalming machine 100 between an "off" position, an "inject" position where the fluid "F" exits the embalming machine 100 and is injected into the human body, and a "stall" position where the fluid "F" circulates within the plumbing components of the embalming machine 100 without being injected into the human body. As discussed in further detail below, the first switch 160 is electrically coupled to a first solenoid 260 to help control this flow of fluid "F."

The second switch 170 is configured to switch the embalming machine 100 between a "pulse" position where the fluid "F" is moved within the embalming machine 100 in a pulsing manner (e.g., similar to the way blood is typically moved through a body), and a "non-pulse" (e.g., constant flow) position. As discussed in further detail below, the second switch 170 is electrically coupled to a second solenoid 270 to help control this flow of fluid "F."

The first indicator 180 is electrically coupled to the first switch 160 and is configured to be "off" or continuously illuminated to indicate the pump 250 and the first solenoid 260 are functioning. While other arrangements are contemplated, the first indicator 180 being "off" may indicate that the first switch 160 is in the "off" position, the first indicator 180 being continuously illuminated may indicate that the first switch 160 is in the "inject" position.

The second indicator 190 is electrically coupled to the first switch 160 and is configured to be "off" or continuously illuminated to indicate the pump 250 is functioning while first solenoid 260 is not. While other arrangements are contemplated, the second indicator 190 being "off" may indicate that the first switch 160 is in the "off" position, the second indicator 190 being continuously illuminated may indicate that the first switch 160 is in the "stall" position.

Figure 2:
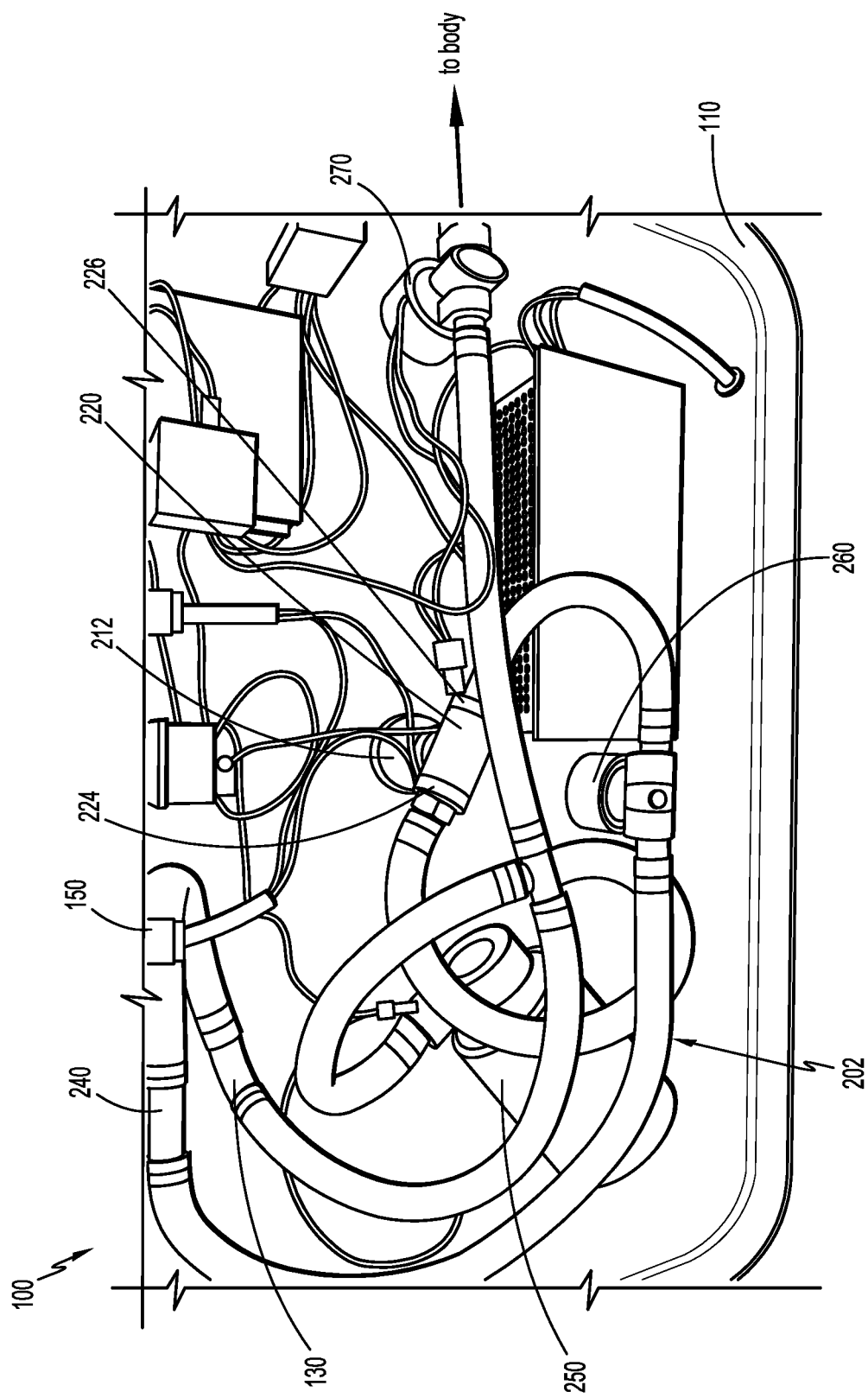
FIG. 2 is a bottom, perspective view the embalming machine of FIG. 1.

Referring now to FIGS. 2-3, further details of the embalming machine 100 are shown. A bulkhead assembly 210 is shown in FIG. 3 and includes a bulkhead 212, a gasket 214, and a nut 216. The bulkhead 212 defines a passageway 213 for the fluid "F" to travel from the fluid tank 120 into the plumbing components within the housing 110. The gasket 214 is positioned between a top lip of the bulkhead 212, and a bottom wall of the fluid tank 120. The nut 216 radially surrounds a portion of the bulkhead 212 and is secured against an upper wall of the housing 110.

A first plumbing tee 220 is coupled to the bulkhead assembly 210. The first plumbing tee 220 includes an inlet passage 222, a first leg 224, and a second leg 226. The inlet passage 222 defines an inlet diameter (e.g., ½" diameter), the first leg 224 defines a first diameter (e.g., ½" diameter), and the second leg 226 defines a second diameter (e.g., ⅜" diameter). The first diameter of the first leg 224 is larger than the second diameter of the second leg 226, thereby causing the fluid "F" to flow from the inlet passage 222 through the first leg 224 in the general direction of arrow "A" as illustrated in FIG. 3.

If the pump 250 is not running while the first switch 160 is in the "inject" position, the embalming machine 100 can, via gravity, inject fluid into the human body with mild force and flow since the inject setting will send current to the output or first solenoid 260 and permit flow therethrough. In such circumstances, the user must set the relief controller 240 to permit passage of fluid. Here, the fluid will travel in the opposite direction than shown (e.g., generally opposite the direction of arrow "A" in FIG. 3.

With continued reference to FIG. 3, a hose or tube 202 interconnects the various plumbing components of the embalming machine 100. A first section 202a of the hose 202 interconnects the first leg 224 of the first plumbing tee 220 with an inlet portion of the pump 250. The pump 250 is configured to help circulate the fluid "F" through various components of the embalming machine 100. As noted above, the speed of the pump 250 is controlled by the pump controller 150. A second section 202b of the hose 202 interconnects an outlet portion of the pump 250 with an inlet passage 232 of a second plumbing tee 230. The pressure gauge 130 is operatively coupled to a first leg 234 of the second plumbing tee 230 and is configured to read the pressure of the fluid "F" within the second plumbing tee 230. A third section 202c of the hose 202 interconnects a second leg 236 of the second plumbing tee 230 with an inlet passage 242 of a third plumbing tee 241.

The third plumbing tee 241 includes a first outlet 244 and a second outlet 246. The flow of the fluid "F" through the first outlet 244 and/or the second outlet 246 is controlled by a combination of the relief controller 240, the first solenoid 260, and the second solenoid 270. More particularly, a fourth section 202d of the hose 202 interconnects the first outlet 244 of the third plumbing tee 241 with the first solenoid 260. A fifth section 202e of the hose 202 is coupled to an outlet of the first solenoid 260 and is directly or indirectly coupled to the human body or to check valve 122A for top down mixing of fluid solution. As noted above, the first switch 160 is electrically coupled to the first solenoid 260 and controls the passage of fluid "F" through the first solenoid 260 and into the human body.

More particularly, when current is supplied to the first solenoid 260 (and the second solenoid 270), the solenoid is fully open; when no current is applied, the solenoids are closed. By being able to control the pump 250 with electrical current, the embalming machine 100 is able to be used at full force and displacement, or with less than full force and displacement, depending on the settings. Here, the user is able to introduce a low force and low displacement injection to help prevent saturating the tissue of the human body. To decrease the fluid passage of other embalming machines, the user typically uses a ball valve at the output to restrict fluid passage and encourage passage through a recycle ball valve. However, in such machines, the measurement from the pressure gauge does not reflect the injection output because the measurement of the pressure is invalidated as fluid is able to find relief via the recycle pathway, and because pressure beyond the ball valve at the output of the embalming machine is less than before if the passage is restricted in any way. In the embalming machine 100 of the present disclosure, the user is able to safely introduce fluid without negative consequence while prohibiting any recycling. Additionally, without a need for an output ball valve to restrict fluid passage, a true measurement of pressure is visible to the user.

A sixth section 202f of the hose 202 interconnects the second outlet 246 of the third plumbing tee 241 with the relief controller 240. As noted above, the relief controller 240 coupled to the lever 140 allows a user to control the volume of fluid "F" that flows through the relief controller 240. As can be appreciated, the greater volume of fluid that flows through the relief controller 240 the less volume of fluid that flows through the first solenoid 260, and vice versa. Thus, the user is able to operate the lever 140 to determine the amount of the fluid "F" that enters the human body, and the amount of the fluid "F" that recirculates through the embalming machine 100.

A seventh section 202g of the hose 202 interconnects the relief controller 240 with the second solenoid 270. As noted above, the second solenoid 270 is controlled by the second switch 170. The second solenoid 270 is configured to cause the fluid flowing therethrough to be pulsed or non-pulsed. In the pulsed setting, the second solenoid 270 effectively simulates the pulsing of blood through a living body. In embodiments, when the second switch 170 is switched on, the second solenoid 270 receives current intermittently and therefore activates the pulsing of fluid; when the second switch 170 is switched off, the second solenoid 270 receives continuous current and fluid flows in a continuous, non-pulsed manner through the second solenoid 270. Additionally, in the "pulse" setting, the embalming machine 100 switches between a state of injection, where the fluid is injected into the body, and relief, where the fluid is recirculated back through the embalming machine 100.

An eighth section 202h of the hose 202 interconnects the second solenoid 270 with the second leg 226 of the first plumbing tee 220. Thus, the fluid "F" travelling through the eighth section 202h of the hose 202 flows through the first leg 224 of the first plumbing tee 220 and is recirculated in the manner discussed hereinabove.

While the present disclosure envisions various diameters of hoses, outlets and inlets, and is in no way limited to the specific values disclosed herein, the diameter of the inlet passage 222 of the first plumbing tee 200, and the diameter of the first section 202a of the hose (and associated ports) may be about ½", and the diameter of the other hose sections 202b-202h of the hose 202 (and associated ports) may be about ⅜".

Figure 4:
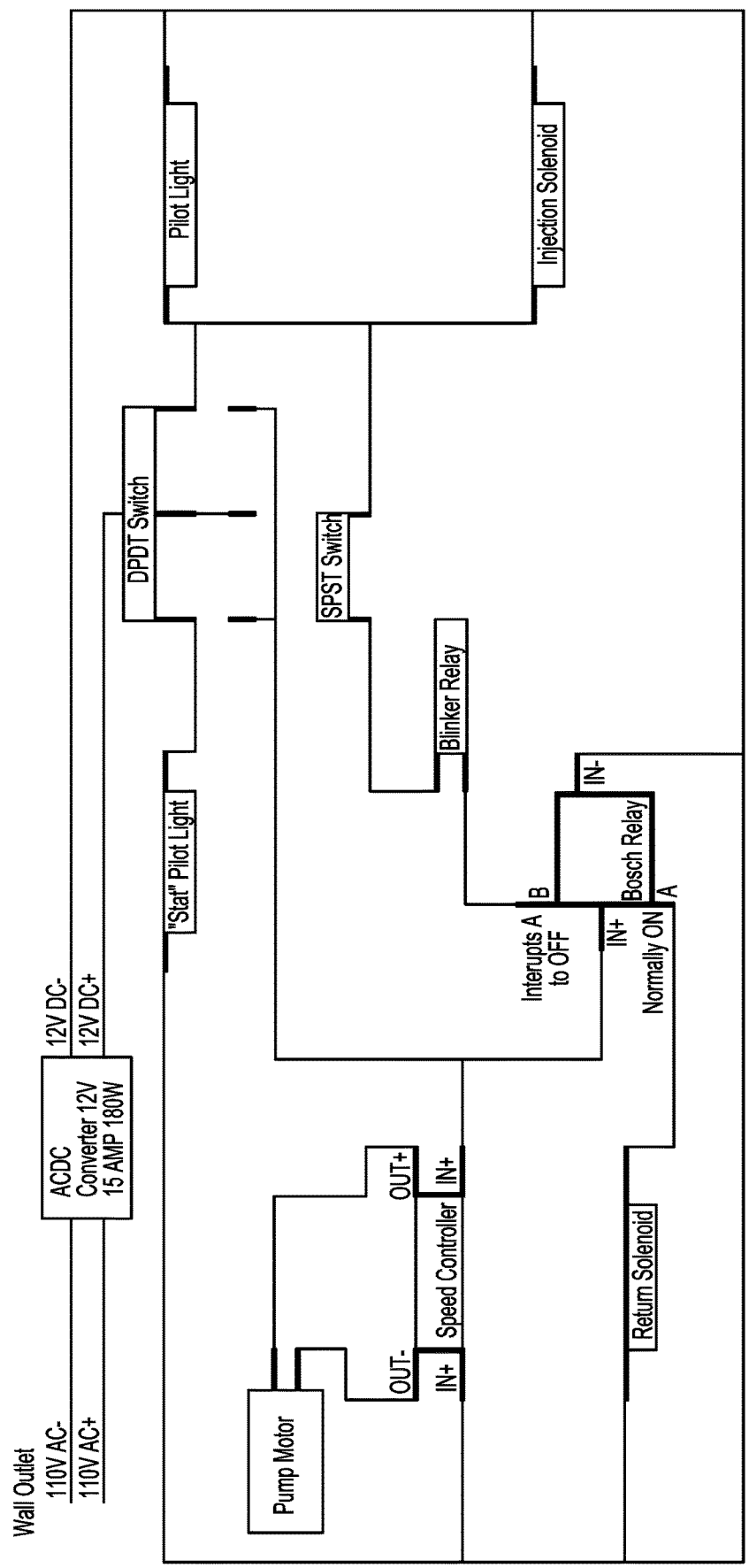
FIG. 4 is a schematic diagram illustrating various electrical components of the embalming machine of FIGS. 1-3.

Referring to FIG. 4, an electrical schematic of the embalming machine 100 described above is shown.

Referring now to FIGS. 5-8, the second embodiment of the embalming machine 1000 is shown. The second embodiment of the embalming machine 1000 is similar to the first embodiment of the embalming machine 100, with the main exception being that the embalming machine 1000 includes two fluid tanks 1200a and 1200b, instead of a single fluid tank. The inclusion of two fluid tanks provides the user or embalmer with the benefit of being able to introduce a first fluid "F1" (e.g., preinjection surfactants) into a human body and a second fluid "F2" (e.g., preservative chemicals) into the human body using the same device.

Figure 5:
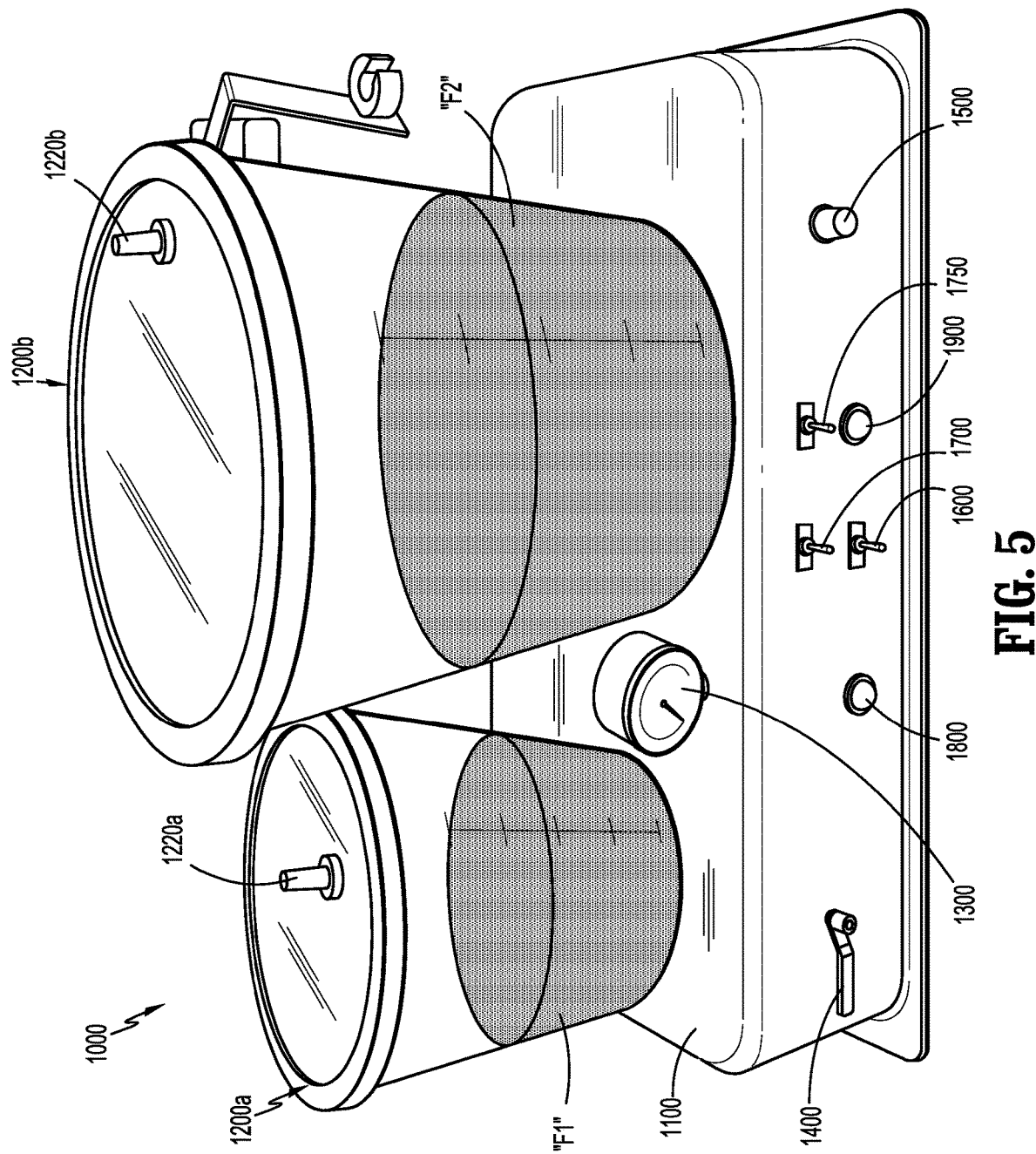
FIG. 5 is a perspective view of an embalming machine having two reservoirs in accordance with an embodiment of the present disclosure.

With particular reference to FIG. 5, the embalming machine 1000 includes a housing 1100, a first fluid tank 1200a, a second fluid tank 1200b, a pressure gauge 1300, a lever 1400 (engaged with a relief controller 2400), a pump controller 1500, a first switch 1600, a second switch 1700, a third switch 1750, a first indicator light 1800, and a second indicator light 1900. Generally, the embalming machine 1000 effectively and efficiently delivers fluids "F1" and "F2" from within the respective fluid tanks 1200a, 1200b into a human body within a particular pressure and flow range.

Figure 7:
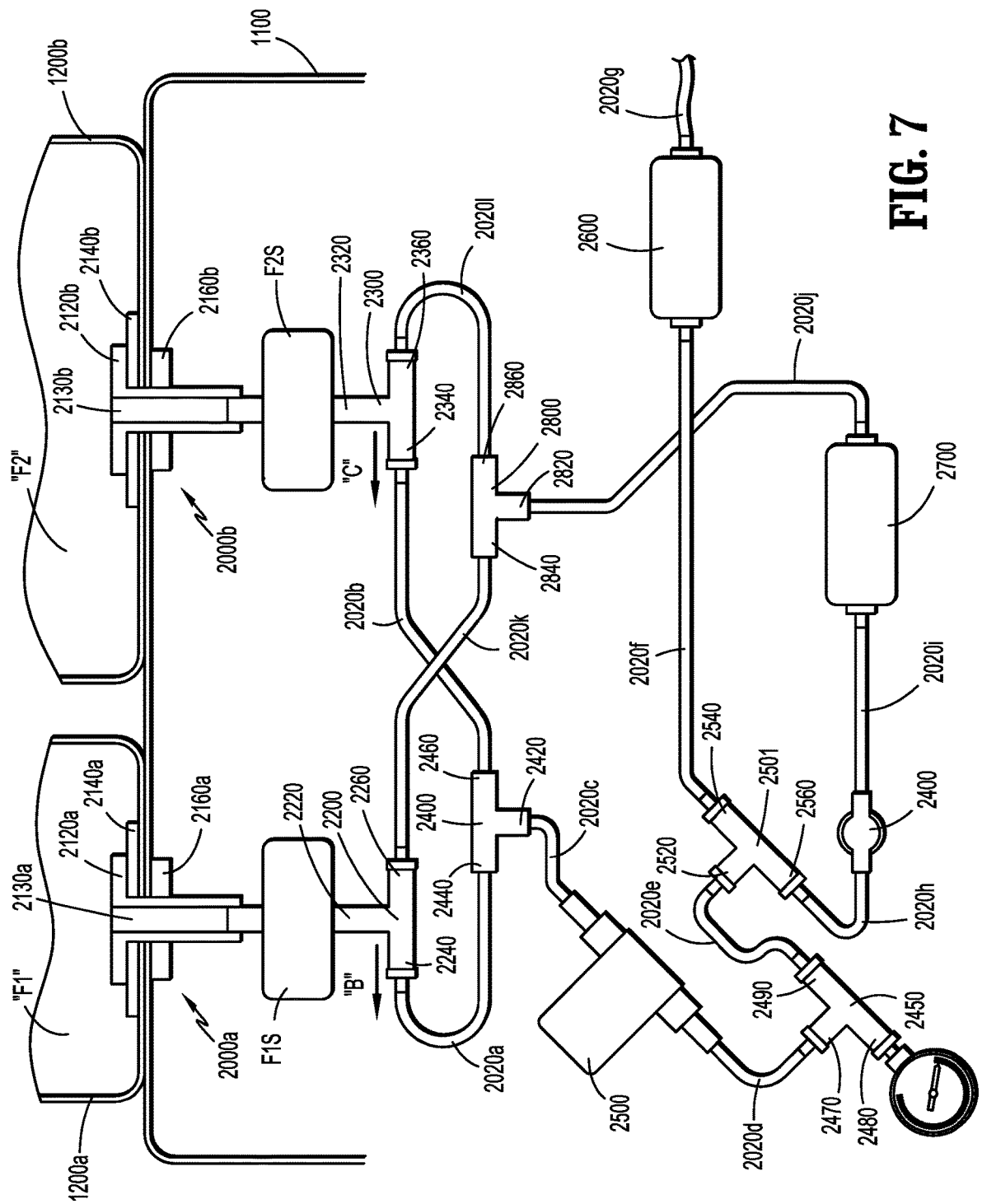
FIG. 7 is a schematic diagram illustrating various plumbing components of the embalming machine of FIGS. 5 and 6.

The fluid tanks 1200a, 1200b are supported by the housing 1100 and are operably engaged with plumbing components within the housing 1100 via respective bulkhead connections 2000a, 2000b (FIG. 7). Each fluid tank 1200a, 1200b includes a check valve 1220a, 1220b, respectively, on an upper portion thereof which allows air to enter the respective fluid tanks 1200a, 1200b to help enable the mixing of gas and/or fluid within the fluid tanks 1200a, 1200b in a top-to-bottom manner through the plumbing components and displace fluid in the same manner. The check valves 1220a, 1220b also prevent air/gas from exiting the respective fluid tanks 1200a, 1200b. Additionally, the check valves 1220a, 1220b, which permit the flow of air or liquid into the reservoirs only, prevent chemicals from becoming airborne and exposing the operator to the harsh chemicals. The embalming machine 1000 with the check valves 1220a, 1220b can be emptied and cleaned with fresh solution without regurgitation back to the fluid tanks 1200a, 1200b. Further, fluid can be introduced (initially introduced and/or recirculated) to the fluid tanks 1220a and/or 1200b through the respective check valve 1220a, 1220b. Moreover, the check valves 1220a, 1220b may facilitate the mixing of the first fluid "F1" within the first fluid tank 1200a with the mixing of the second fluid "F2" within the fluid tank 1200b.

Additionally, the ability of the user to select fluid from the first tank 1200a and/or the second tank 1200b allows the user more flexibility in determining the concentrations of various chemicals in the fluids "F1" and "F2." For instance, instead of selecting a particular chemical blend or concentration to be used as the embalming agent, for instance, the user can choose a first fluid "F1" having first blend or concentration (e.g., a relatively low concentration) and a second fluid "F2" having a second blend or concentration (e.g., a relatively high concentration). Then, using the various controls of the embalming machine 1000, the user can control the mixing of the fluids "F1" and "F2" in real time in response to observed results in the body, for instance.

The pressure gauge 1300 is engaged with a portion of the plumbing components within the housing 1100 (discussed below), and allows a user to see the pressure of the fluid that is flowing therethrough. The pressure gauge 1300 may include a digital display measurement. The pressure gauge 1300 represents actual pump force being applied from the point of injection into the human body while the relief controller 2400 does not permit fluid flow therethrough for recirculation. In any varied adjustment of the relief controller 2400, the pressure gauge 1300 provides a frame of reference which can help the user better determine the speed at which the pump (discussed below) should be operated.

The relief controller 2400 (e.g., ball valve) is operatively engaged with the lever 1400 (FIG. 5), and allows a user to adjust the amount of fluid flowing therethrough. More specifically, the lever 1400 of the relief controller 2400 allows a user adjustment, as fluid exits the embalming machine 1000 and into the human body, of an alternative path for fluid travel which recirculates fluid through various parts of the embalming machine 1000. In any such adjustment, the force and displacement of fluid exiting the embalming machine 1000 and into the human body will have been modified.

The pump controller 1500 is configured as a knob, is operably (e.g., electrically) connected to a pump 2500 (FIGS. 6-7), and is configured to control the speed at which the pump 2500 operates. While the pump controller 1500 is illustrated as a knob, any suitable type of mechanism to control the speed of the pump may be used. During use, adjusting or controlling the speed of the pump 2500 helps the set the pressure (shown on the pressure gauge 1300) and displacement to an appropriate pressure displacement or within a desired range. The pump controller 1500 may include a digital display measurement of electrical current and be operated remotely (e.g., via remote control).

The first switch 1600 is a double throw switch and is configured to switch the embalming machine 1000 between an "off" position, an "inject" position where the fluid "F1" or "F2" exits the embalming machine 1000 and is injected into the human body, and a "stall" position where the fluid "F1" or "F2" circulates within the plumbing features of the embalming machine 1000 without being injected into the human body. As discussed in further detail below, the first switch 1600 is electrically coupled to a first solenoid 2600 to help control this flow of fluid "F1" or "F2."

The second switch 1700 is configured to switch the embalming machine 1000 between a "pulse" position where the fluid "F1" or "F2" is moved within the embalming machine 1000 in a pulsing manner (e.g., similar to the way blood is typically moved through a body), and a "non-pulse" (e.g., constant flow) position. As discussed in further detail below, the second switch 1700 is electrically coupled to a second solenoid 2700 to help control this flow of fluid "F1" or "F2."

The third switch 1750 is configured to determine which fluid tank 1200a or 1200b is the active fluid tank. That is, when the third switch 1750 is moved to a first position (e.g., to the left in FIG. 5), the first fluid tank 1200a is selected as the active fluid tank, and when the third switch 1750 is moved to a second position (e.g., to the right in FIG. 5), the second fluid tank 1200b is selected as the active fluid tank. The selection of the active fluid tank dictates which fluid "F1" or "F2" is circulated through the embalming machine 1000 and/or into the human body.

The first indicator 1800 is electrically coupled to the first switch 1600 and is configured to be "off" or continuously illuminated to indicate the pump 2500 and the first solenoid 2600 are functioning. While other arrangements are contemplated, the first indicator 1800 being "off" may indicate that the first switch 1600 is in the "off" position, the first indicator 1800 being continuously illuminated may indicate that the first switch 1600 is in the "inject" position.

The second indicator 1900 is electrically coupled to the first switch 1600 and is configured to be "off" or continuously illuminated to indicate the pump 2500 is functioning while first solenoid 2600 is not. While other arrangements are contemplated, the second indicator 1900 being "off" may indicate that the first switch 1600 is in the "off" position, the second indicator 1900 being continuously illuminated may indicate that the first switch 1600 is in the "stall" position.

Figure 6:
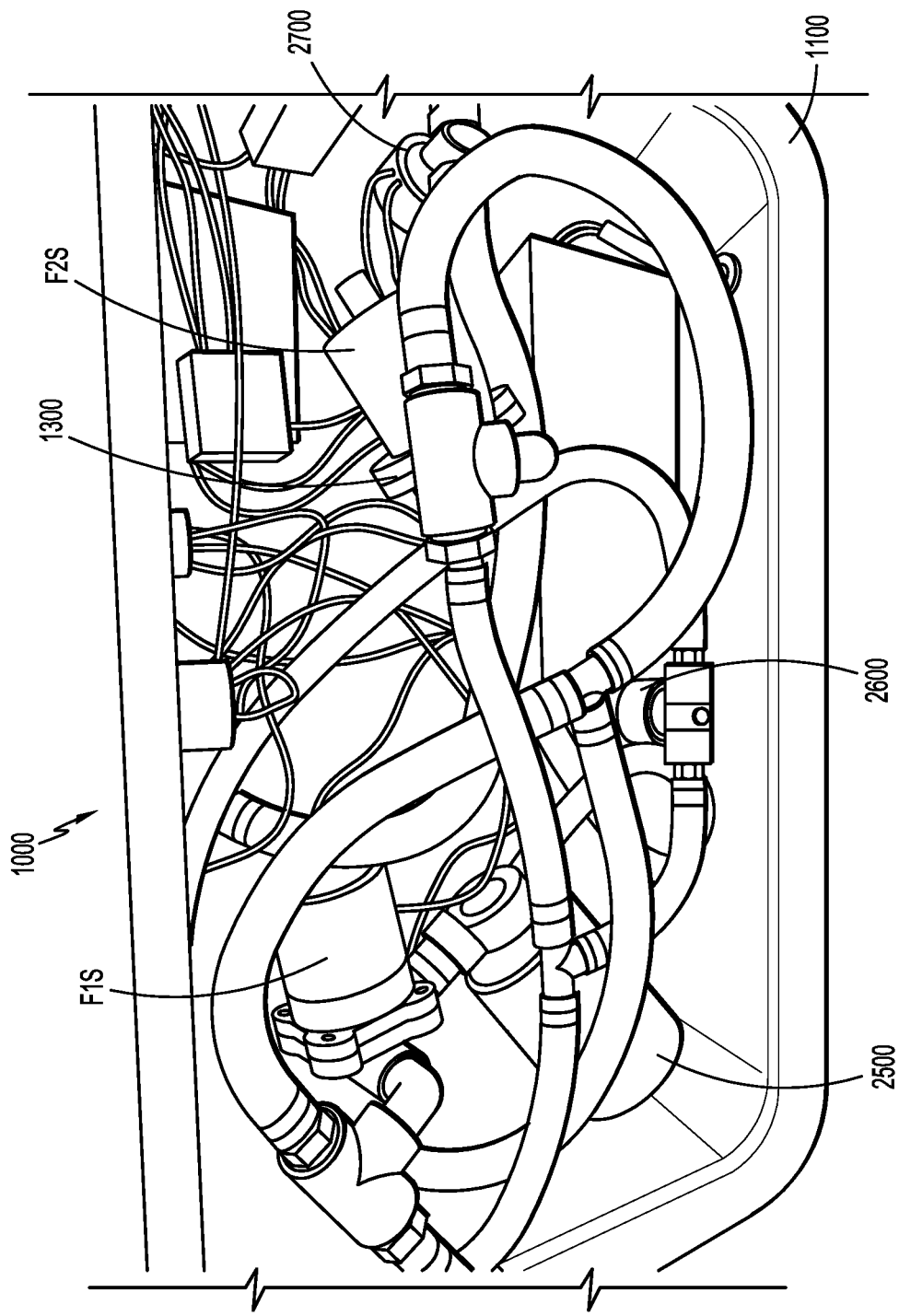
FIG. 6 is a bottom, perspective view the embalming machine of FIG. 5.

Referring now to FIGS. 6-7, further details of the embalming machine 1000 are shown. A first bulkhead assembly 2100a and a second bulkhead assembly 2100b are shown in FIG. 7. The first bulkhead assembly 2100a is engaged with the first fluid tank 1200a, and the second bulkhead assembly 2100b is engaged with the second fluid tank 1200b. Each bulkhead assembly 2100a, 2100b includes respective bulkheads 2120a, 2120b, gaskets 2140a, 2140b, and nuts 2160a, 2160b. Each bulkhead 2120a, 2120b defines a passageway 2130a, 2130b for the fluid "F1" or "F2" to travel from the fluid tank 1200a, 1200b, respectively, into the plumbing components within the housing 1100. The gaskets 2140a, 2140b re positioned between a top lip of the respective bulkhead 2120a, 2120b, and a bottom wall of the respective fluid tank 1200a, 1200b. The nuts 2160a, 2160b radially surround a portion of the respective bulkhead 2120a, 2120b and are secured against an upper wall of the housing 1100.

A first fluid solenoid F1S is coupled to the first bulkhead assembly 2100a, and a second fluid solenoid F2S is coupled to the second bulkhead assembly 2100b. Based on the selection of the third switch 1750, either the first fluid solenoid F1S or the second fluid solenoid F2S is supplied with current, which causes the respective fluid to flow from the respective fluid tank 1200a, 1200b through the respective solenoid. That is, if the third switch 1750 is in a position selecting the first fluid "F1," the first fluid solenoid F1S is activated such that the first fluid "F1" flows from the first fluid tank 1200a through the first fluid solenoid F1S, and vice versa.

A first plumbing tee 2200 is coupled to the first fluid solenoid F1S, and two sections of a tube or hose 2020. The first plumbing tee 2200 includes an inlet passage 2220, a first leg 2240, and a second leg 2260. The inlet passage 2220 defines an inlet diameter (e.g., ½" diameter), the first leg 2240 defines a first diameter (e.g., ½" diameter), and the second leg 2260 defines a second diameter (e.g., ⅜" diameter). The first diameter of the first leg 2240 is larger than the second diameter of the second leg 2260, thereby causing the fluid "F" to flow from the inlet passage 2220 through the first leg 2240 in the general direction of arrow "B" in FIG. 7.

If the pump 2500 is not running while the first switch 1600 is in the "inject" position, the embalming machine 1000 can, via gravity, inject fluid into the human body with mild force and flow since the inject setting will send current to the output or first solenoid 2600 and permit flow therethrough. In such circumstances, the user must set the relief controller 2400 to permit passage of fluid. Here, the fluid will travel in the opposite direction than shown (e.g., generally opposite the direction of arrow "B" in FIG. 7.

A second plumbing tee 2300 is coupled to the second fluid solenoid F2S, and two sections of a hose 2020. The second plumbing tee 2300 includes an inlet passage 2320, a first leg 2340, and a second leg 2360. The inlet passage 2320 defines an inlet diameter (e.g., ½" diameter), the first leg 2340 defines a first diameter (e.g., ½" diameter), and the second leg 2360 defines a second diameter (e.g., ⅜" diameter). The first diameter of the first leg 2340 is larger than the second diameter of the second leg 2360, thereby causing the fluid "F" to flow from the inlet passage 2320 through the first leg 2340 in the general direction of arrow "C" in FIG. 7.

With continued reference to FIG. 7, the hose 2020 interconnects the various plumbing components of the embalming machine 1000. A first section 2020a of the hose 2020 interconnects the first leg 2240 of the first plumbing tee 2200 to a first leg 2440 of a third plumbing tee 2400. A second section 2020b of the hose 2020 interconnects the first leg 2340 of the second plumbing tee 2300 to a second leg 2460 of the third plumbing tee 2400.

A third section 2020c of the hose 2020 interconnects an outlet 2420 of the third plumbing tee 2400 with an inlet portion of the pump 2500. The pump 2500 is configured to help circulate the fluid "F1" or "F2" through various components of the embalming machine 1000. As noted above, the speed of the pump 2500 is controlled by the pump controller 1500. A fourth section 2020d of the hose 2020 interconnects an outlet portion of the pump 2500 to an inlet passage 24700 of a fourth plumbing tee 2450. The pressure gauge 1300 is operatively coupled to a first leg 2480 of the fourth plumbing tee 2450 and is configured to read the pressure of the fluid "F1" or "F2" within the fourth plumbing tee 2450. A fifth section 2020e of the hose 2020 interconnects a second leg 2490 of the fourth plumbing tee 2450 with an inlet passage 2520 of a fifth plumbing tee 2501.

The fifth plumbing tee 2501 includes a first outlet 2540 and a second outlet 2560. The flow of the fluid "F1" or "F2" through the first outlet 2540 and/or the second outlet 2560 is controlled by a combination of the relief controller 2400, the first solenoid 2600, and the second solenoid 2700. More particularly, a sixth section 2020f of the hose 2020 interconnects the first outlet 2540 of the fifth plumbing tee 2501 with the first solenoid 2600. A seventh section 2020g of the hose 2020 is coupled to an outlet of the first solenoid 2600 and is directly or indirectly coupled to the human body or to the respective check valve 2200a, 2200b for top-down mixing of solution. As noted above, the first switch 1600 is electrically coupled to the first solenoid 2600 and helps control the amount of fluid "F1" or "F2" that flows through the first solenoid 2600 and into the human body.

More particularly, when current is supplied to the first solenoid 2600 (and the second solenoid 2700), the solenoid is fully open; when no current is applied, the solenoids are closed. By being able to control the pump 2500 with electrical current, the embalming machine 1000 is able to be used at full force and displacement, or with less than full force and displacement, depending on the settings. Here, the user is able to introduce a low force and low displacement injection to help prevent saturating the tissue of the human body. To decrease the fluid passage of other embalming machines, the user typically uses a ball valve at the output to restrict fluid passage and encourage passage through a recycle ball valve. However, in such machines, the measurement from the pressure gauge does not reflect the injection output because the measurement of the pressure is invalidated as fluid is able to find relief via the recycle pathway, and because pressure beyond the ball valve at the output of the embalming machine is less than before if the passage is restricted in any way. In the embalming machine 1000 of the present disclosure, the user is able to safely introduce fluid without negative consequence while prohibiting any recycling. Additionally, without a need for an output ball valve to restrict fluid passage, a true measurement of pressure is visible to the user.

An eighth section 2020h of the hose 2020 interconnects the second outlet 2560 of the fifth plumbing tee 2501 and the relief controller 2400. As noted above, the relief controller 2400 coupled to the lever 1400 allows a user to control the volume of fluid "F1" or "F2" that flows through the relief controller 2400. As can be appreciated, the greater volume of fluid that flows through the relief controller 2400 the less volume of fluid that flows through the first solenoid 2600, and vice versa. Thus, the user is able to operate the lever 1400 of the relief controller 2400 to determine the amount of the fluid "F1" or "F2" that enters the human body, and the amount of the fluid "F1" or "F2" that recirculates through the embalming machine 1000.

A ninth section 2020i of the hose 2020 interconnects the relief controller 2400 with the second solenoid 2700. As noted above, the second solenoid 2700 is controlled by the second switch 1700. The second solenoid 2700 is configured to cause the fluid flowing therethrough to be pulsed or non-pulsed. In the pulsed setting, the second solenoid 2700 effectively simulates the pulsing of blood through a living body. In embodiments, when the second switch 1700 is switched on, the second solenoid 2700 receives current intermittently and therefore activates the pulsing of fluid; when the second switch 1700 is switched off, the second solenoid 2700 receives continuous current and fluid flows in a continuous, non-pulsed manner through the second solenoid 2700.

A tenth section 2020j of the hose 2020 interconnects the second solenoid 2700 with an inlet portion 2820 of a sixth plumbing tee 2800. An eleventh section 2020k of the hose 2020 interconnects a first leg 2840 of the sixth plumbing tee 2800 and the second leg 2260 of the first plumbing tee 2200. And a twelfth section 2020l of the hose 2020 interconnects a second leg 2860 of the sixth plumbing tee 2800 with the second leg 2360 of the second plumbing tee 2300. When the first fluid solenoid F1S is activated, the fluid "F1" flows from the sixth plumbing tee 2800 to the first plumbing tee 2200. When the second fluid solenoid F2S is activated, the fluid "F2" flows from the sixth plumbing tee 2800 to the second plumbing tee 2300.

Figure 8:
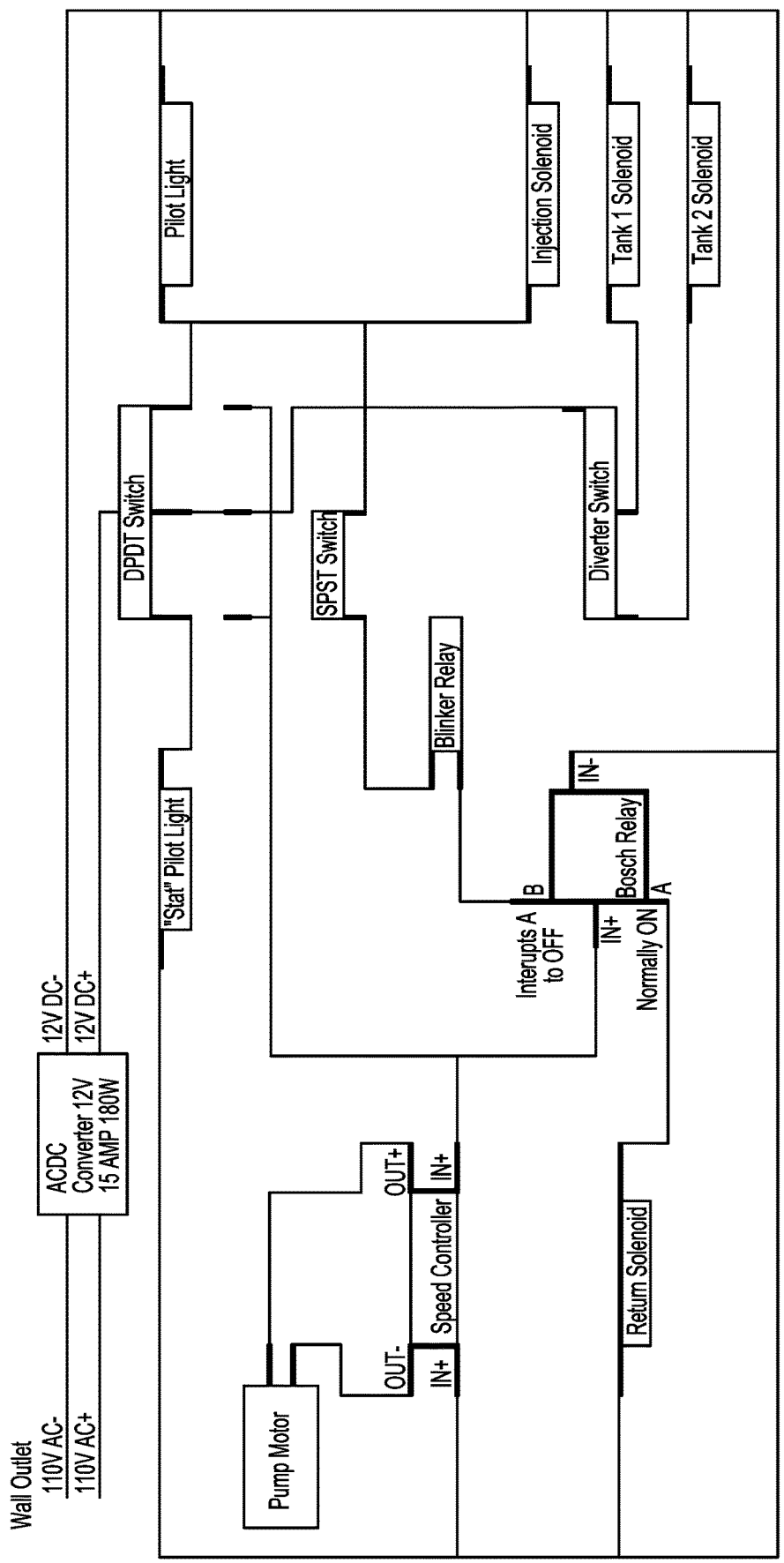
FIG. 8 is a schematic diagram illustrating various electrical components of the embalming machine of FIGS. 5-7.

Referring to FIG. 8, an electrical schematic of the embalming machine 1000 described above is shown.

While physical switches and knobs are shown and described herein, it is contemplated and within the scope of the present disclosure for embalming machines 100, 1000 to be provided with appropriate microprocessors and/or controllers for electronic control of the various components thereof, including and not limited to electronic control, touch screen control, wireless control, remote control, and the like.

It is also envisioned and within the scope of the present disclosure for embalming machines 100, 1000 to include pictograms, symbols, indicia or the like (not shown) rather than or in addition to traditional labels for machine controls. The inclusion of pictograms may help the operator (e.g., international users) better understand the functionality of the respective control. The pictograms establish or are taken from an global standard whereby users around the world may readily understand the function and operation of the controls of embalming machines 100, 1000.

Certain embodiments of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An embalming machine, comprising:
   a housing;
   at least one fluid tank supported by the housing and configured to store at least a first fluid;

a plurality of hose segments disposed at least partially within the housing and in fluid communication with the at least one fluid tank;

a pump engaged with at least one hose segment of the plurality of hose segments;

a pressure gauge engaged with at least one hose segment of the plurality of hose segments and configured to read a pressure of the fluid flowing therethrough; and a first solenoid engaged with at least one hose segment of the plurality of hose segments, the first solenoid configured to allow fluid to flow therethrough when current is applied to the first solenoid, and the first solenoid configured to prevent fluid from flowing therethrough when no current is applied to the first solenoid.

2. The embalming machine according to claim 1, further comprising a plumbing tee disposed in fluid communication with three hose segments of the plurality of hose segments, the plumbing tee establishing a first fluid path where the fluid therein exits the embalming machine, and a second fluid path where the fluid therein recirculates within the embalming machine.

3. The embalming machine according to claim 2, wherein the first solenoid is disposed within the first fluid path.

4. The embalming machine according to claim 3, further comprising a second solenoid disposed within the second fluid path, the second solenoid configured to allow fluid to flow therethrough when current is applied to the second solenoid, and the second solenoid configured to prevent fluid from flowing therethrough when no current is applied to the second solenoid.

5. The embalming machine according to claim 4, further comprising a switch disposed in electrical communication with the second solenoid, the switch configured to enable fluid to flow through the second solenoid in a pulsing manner.

6. The embalming machine according to claim 4, further comprising a relief controller within the second fluid path between the plumbing tee and the second solenoid, the relief controller configured to allow adjustment of the volume of fluid flowing therethrough.

7. The embalming machine according to claim 1, further comprising a pump controller disposed in electrical communication with the pump and configured to control a speed at which the pump operates.

8. The embalming machine according to claim 1, wherein the at least one fluid tank includes a first fluid tank and a second fluid tank.

9. The embalming machine according to claim 8, wherein the embalming machine is configured to selectively circulate fluid from the first fluid tank or fluid from the second fluid tank.

10. The embalming machine according to claim 8, wherein the first fluid tank includes a check valve on an upper portion thereof which allows gas to enter the first fluid tank and prevents gas from exiting the first fluid tank, and wherein the second fluid tank includes a check valve on an upper portion thereof which allows gas to enter the second fluid tank and prevents gas from exiting the second fluid tank.

11. The embalming machine according to claim 1, wherein the at least one fluid tank includes a check valve on an upper portion thereof which allows gas to enter the at least one fluid tank and prevents gas from exiting the at least one fluid tank.

12. The embalming machine according to claim 11, wherein the check valve allows fluid within the at least one fluid tank to mix in a top-down manner.

13. An embalming machine, comprising:

a housing;

a first fluid tank supported by the housing and configured to store a first fluid;

a second fluid tank supported by the housing and configured to store a second fluid;

a plurality of hose segments disposed at least partially within the housing and in fluid communication with the first fluid tank and the second fluid tank;

a pump engaged with at least one hose segment of the plurality of hose segments;

a pressure gauge engaged with at least one hose segment of the plurality of hose segments and configured to read a pressure of the second fluid flowing therethrough; and a valve disposed in fluid communication with at least one hose segment of the plurality of hose segments and configured to allow adjustment of the volume of fluid flowing therethrough;

wherein the embalming machine is configured to selectively circulate either the first fluid from the first fluid tank or the second fluid from the second fluid tank.

14. The embalming machine according to claim 13, wherein the first fluid tank includes a check valve on an upper portion thereof which allows gas to enter the first fluid tank and prevents gas from exiting the first fluid tank, and wherein the second fluid tank includes a check valve on an upper portion thereof which allows gas to enter the second fluid tank and prevents gas from exiting the second fluid tank.

15. The embalming machine according to claim 13, further comprising a plumbing tee disposed in fluid communication with three hose segments of the plurality of hose segments, the plumbing tee establishing a first fluid path where the fluid therein exits the embalming machine, and a second fluid path where the fluid therein recirculates within the embalming machine.

16. The embalming machine according to claim 15, further comprising a first solenoid, a second solenoid, and a switch, the first solenoid disposed within the first fluid path, the second solenoid disposed within the second fluid path, the first solenoid configured to allow fluid to flow therethrough when current is applied to the first solenoid, the first solenoid configured to prevent fluid from flowing therethrough when no current is applied to the first solenoid, the second solenoid configured to allow fluid to flow therethrough when current is applied to the second solenoid, the second solenoid configured to prevent fluid from flowing therethrough when no current is applied to the second solenoid, the switch disposed in electrical communication with the second solenoid, and the switch configured to enable fluid to flow through the second solenoid in a pulsing manner.

17. A method of embalming a cadaver, comprising:

moving a first fluid from a first fluid tank of an embalming machine through a plurality of hose segments, and into the cadaver;

moving a second fluid from a second fluid tank of the embalming machine through the plurality of hose segments, and into the cadaver;

selectively supplying current to a first solenoid of the embalming machine to permit the flow of the second fluid therethrough;

determining the pressure of the second fluid before the second fluid flows through the first solenoid; and adjusting a speed of a pump of the embalming machine.

18. The method according to claim 17, further including introducing air into the first fluid tank through a first check valve located on the first fluid tank, and introducing air into the second fluid tank through a second check valve located on the second fluid tank.

19. The method according to claim 17, further including selectively supplying current to a second solenoid to enable the second fluid to flow therethrough in a pulsing manner.

* * * * *